United States Patent
Sultan et al.

(10) Patent No.: US 11,741,371 B2
(45) Date of Patent: Aug. 29, 2023

(54) AUTOMATICALLY GENERATING DIVERSE TEXT

(71) Applicant: International Business Machines Corporation, Armonk, NY (US)

(72) Inventors: MD Arafat Sultan, Croton-on-Hudson, NY (US); Vittorio Castelli, Croton-on-Hudson, NY (US); Shubham Chandel, Jersey City, NJ (US); Ramon Astudillo, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 16/825,517

(22) Filed: Mar. 20, 2020

(65) Prior Publication Data

US 2021/0295172 A1    Sep. 23, 2021

(51) Int. Cl.
*G06N 3/088* (2023.01)
*G06F 16/2452* (2019.01)
(Continued)

(52) U.S. Cl.
CPC ....... *G06N 3/088* (2013.01); *G06F 16/24522* (2019.01); *G06F 40/30* (2020.01); *G06N 3/042* (2023.01)

(58) Field of Classification Search
CPC ...... G06N 3/088; G06N 3/0427; G06N 5/022; G06N 5/041; G06N 3/0454; G06N 3/0472;
(Continued)

(56) References Cited

U.S. PATENT DOCUMENTS

| 9,727,642 B2 * | 8/2017 | Adderly | ............. G06F 16/3346 |
| 10,318,870 B2 * | 6/2019 | Adderly | ................. G06N 5/022 |

(Continued)

FOREIGN PATENT DOCUMENTS

| CN | 108846130 A | 11/2018 |
| CN | 109992657 A | 7/2019 |

OTHER PUBLICATIONS

Kalpesh Krishna & Mohit Iyyer, Generating Question-Answer Hierarchies, Jul. 21, 2019.*
(Continued)

*Primary Examiner* — Thuykhanh Le
(74) *Attorney, Agent, or Firm* — Lieberman & Brandsdorfer, LLC

(57) ABSTRACT

Embodiments relate to an artificial intelligence (AI) computer platform to incorporate synthetic data and ground truth data, and to promote diversity and accuracy in generating the synthetic data. Synthetic questions are generated by a question generator in response to semantically related ground truth passage and answer data. Each generated question is presented to an answer generator together with the semantically related ground truth passage. Each synthetic question is evaluated with respect to its diversity from previous synthetic questions generated for the same ground truth passage and answer data. Each synthetic question is also evaluated with respect to the accuracy of the answer generated by the answer generator. A reward function that captures both accuracy and diversity of each synthetic question is leveraged to selectively modify the question generator, with the selective modification(s) directed at increasing textual diversity and maintaining accuracy of the generated synthetic questions.

17 Claims, 6 Drawing Sheets

(51) Int. Cl.
*G06F 40/30* (2020.01)
*G06N 3/042* (2023.01)

(58) Field of Classification Search
CPC ..... G06N 3/08; G06F 16/24522; G06F 40/30; G06F 16/35; G06F 16/3329
USPC .......................................................... 706/11
See application file for complete search history.

(56) References Cited

U.S. PATENT DOCUMENTS

| | | | | |
|---|---|---|---|---|
| 11,074,829 | B2* | 7/2021 | Zhang | G09B 7/04 |
| 11,086,911 | B2* | 8/2021 | Jagan | G06F 40/30 |
| 11,205,097 | B2* | 12/2021 | Masse | G06N 3/082 |
| 11,227,218 | B2* | 1/2022 | Min | G06F 40/20 |
| 11,508,479 | B2* | 11/2022 | Uske | G16H 10/20 |
| 11,531,818 | B2* | 12/2022 | Kim | G06N 20/00 |
| 11,580,145 | B1* | 2/2023 | Kumar | G06F 16/3347 |
| 2009/0280456 | A1* | 11/2009 | Ishaq | G09B 19/0053 434/350 |
| 2014/0074645 | A1* | 3/2014 | Ingram | G06Q 30/08 705/26.4 |
| 2015/0339590 | A1* | 11/2015 | Maarek | G06N 20/00 707/754 |
| 2016/0063879 | A1* | 3/2016 | Vanderwende | G06F 16/3329 434/322 |
| 2016/0140446 | A1* | 5/2016 | Adderly | G06N 5/022 706/51 |
| 2017/0154015 | A1* | 6/2017 | O'Keeffe | G06F 3/04812 |
| 2018/0528181 | | 2/2018 | Bethard | |
| 2018/0137527 | A1* | 5/2018 | Noelting | G06Q 30/0204 |
| 2018/0260472 | A1 | 9/2018 | Kelsey et al. | |
| 2018/0300312 | A1* | 10/2018 | Rai | G06N 3/08 |
| 2019/0043379 | A1* | 2/2019 | Yuan | G09B 7/02 |
| 2019/0057320 | A1* | 2/2019 | Docherty | G06F 18/2148 |
| 2019/0072506 | A1* | 3/2019 | Mandal | G01N 21/9508 |
| 2019/0147215 | A1* | 5/2019 | Al-Kofahi | G06T 7/0012 382/133 |
| 2019/0303473 | A1* | 10/2019 | Sen | G06F 16/24522 |
| 2020/0042644 | A1* | 2/2020 | Jagan | G06N 3/08 |
| 2020/0183962 | A1* | 6/2020 | Carrier | G06N 20/00 |
| 2020/0194103 | A1* | 6/2020 | Weldemariam | G16H 10/60 |
| 2020/0271739 | A1* | 8/2020 | Zhu | G01R 33/3664 |
| 2020/0279018 | A1* | 9/2020 | Hamas | G06F 40/58 |
| 2020/0311212 | A1* | 10/2020 | Moss | G06F 16/90332 |
| 2021/0110895 | A1* | 4/2021 | Shriberg | G06F 40/20 |
| 2021/0174016 | A1* | 6/2021 | Fox | G06N 3/044 |
| 2021/0201192 | A1* | 7/2021 | Kim | G06N 3/045 |
| 2021/0232613 | A1* | 7/2021 | Raval Contractor | G06N 5/02 |
| 2021/0240776 | A1* | 8/2021 | Jawagal | G06N 3/049 |
| 2021/0240942 | A1* | 8/2021 | Choi | G06F 40/56 |
| 2021/0241099 | A1* | 8/2021 | Li | G06N 3/088 |
| 2021/0287101 | A1* | 9/2021 | Das | G06F 18/217 |
| 2021/0383077 | A1* | 12/2021 | Contractor | G06Q 10/10 |
| 2022/0014807 | A1* | 1/2022 | Lin | G06V 20/635 |
| 2023/0069935 | A1* | 3/2023 | Choi | G06F 16/3329 |

OTHER PUBLICATIONS

PCT/IB2021/051903 International Search Report and Written Opinion, dated Jun. 17, 2021.
Yao, Kaichun, et al., "Teaching Machines to Ask Questions," Proceedings of the Twenty-Seventh International Joint Conference on Artificial Intelligence, IJCAI-18, pp. 4546-4552, 2018.
Yuan, X., et al., "Machine Comprehension by Text-to-Text Neural Question Generation", Proceedings of the 2nd Workshop on Representation Learning for NLP, pp. 15-25, 2017.
Zhang, S., et al., "Addressing Semantic Drift in Question Generation for Semi-Supervised Question Answering", Proceedings of the 2019 Conference on Empirical Methods in Natural Language Processing, pp. 2495-2507, 2019.
Xu, J. et al., "Diversity-Promoting GAN: A Cross-Entropy Based Generative Adversarial Network for Diversified Text Generation", roceedings of the 2018 Conference on Empirical Methods in Natural Language Processing, pp. 3940-3949, 2018.
Williams, Ronald J., "Simple Statistical Gradient-Following Algorithms for Connectionist Reinforcement Learning", Machine Learning, 8, pp. 229-256, 1992.
Zhang, S., et al., "Addressing Semantic Drift in Question Generation for Semi-Supervised Question Answering", Proceedings of the 2019 Conference on Empirical Methods in Natural Language Processing and the 9th International Joint Conference on Natural Language Processing, pp. 2495-2509, Hong Kong, China, Nov. 3-7, 2019.
Hosking, T., et al., "Evaluating Rewards for Question Generation Models", arXiv:1902.11049v2, Jun. 1, 2019.
Vijayakumar, A. K., et al., "Diverse Beam Search: Decoding Diverse Solutions From Neural Sequence Models", arXiv:1610.02424v2, Oct. 22, 2018.
Bowman, S. R., et al., "Generating Sentences from a Continuous Space", arXiv 1511.06349v4, May 12, 2016.
Zhao, T., et al., "Learning Discourse-level Diversity for Neural Dialog Models using Conditional Variational Autoencoders", arXiv:1703.10960v3, Oct. 21, 2017.
Zhang, Y., et al., "Improve Diverse Text Generation by Self Labeling Conditional Variational Auto Encoder", arXiv:1903 10842v1, Mar. 26, 2019.
Alberti, C., et al., "Synthetic QO Corpora Generation with Roundtrip Consistency", arXiv:1906.05416v1, Jun. 12, 2019.
Bordes, A., et al., "Learning End-to-End Goal-Oriented Dialog", ICLR 2017, arXiv:1605.07683v4, Mar. 30, 2017.
Cao, K. et al., "Latent Variable Dialogue Models and their Diversity", arXiv:1702.05962v1, Feb. 20, 2017.
Devlin, J., "BERT: Pre-training of Deep Bidirectional Transformers for Language Understanding", arXiv:1810.048052, May 24, 2019.
Dong, L., et al., "Unified Language Model Pre-training for Natural Language Understanding and Generation", 33rd Conference on Neural Information Processing Systems (NeurIPS 2019), arXiv:1905.03197v3, Oct. 15, 2019.
Du, X., et al., "Learning to ask: Neural question generation for reading comprehension", arXiv: 1705.00106V1, Apr. 29, 2017.
Fan Z., et al., "A Question Type Driven Framework to Diversify Visual Question Generation", Proceedings of the Twenty-Seventh International Joint Conference on Artificial Intelligence (IJCAI-18), pp. 4048-4054, 2018.
Holtzman, A., et al., "The Curious Case of Neural Text Degeneration", arXiv:1904.09751v2, Feb. 14, 2020.
Jain, U., et al., "Creativity: Generating Diverse Questions using Variational Autoencoders", arXiv:1704.03493v1, Apr. 11, 2017.
Kingma, D., et al., "Autoencoding Variational Bayes", arXiv:1312.6114v10, May 1, 2014.
Lindberg, D., et al., "Generating Natural Language Questions to Support Learning On-Line", Proceedings of the European Workshop on Natural Language Generation, pp. 105-114, Aug. 2013.
Liu, Y., et al., "RoBERTa: A Robustly Optimized BERT Pretraining Approach", arXiv: 1907.11692v1, Jul. 26, 2019.
Radford, A., et al., "Language Models are Unsupervised Multitask Learners", 2019.
Raffel, C., et al., "Exploring the Limits of Transfer Learning with a Unified Text-to-Text Transformer", arXiv:1910.10683v2, Oct. 24, 2019.
Rajpurkar, P., et al., SQuAD: 100,000+ Questions for Machine Comprehension of Text, arXiv:1606.05250v3, Oct. 11, 2016.
Trischler, A., et al., "NewsQA: A Machine Comprehension Dataset", Proceedings of the 2nd Workshop on Representation Learning for NLP, pp. 191-200, Vancouver, Canada, Aug. 3, 2017.
AU 2021236965 Examination Report for Standard Patent Application, dated Mar. 22, 2023.

* cited by examiner

AUTOMATICALLY GENERATING DIVERSE TEXT

BACKGROUND

The present embodiments relate to an artificial intelligence platform and an optimization methodology to automatically generate diverse text corresponding to a received input passage and input answer. More specifically, the present embodiments are directed at evaluating the generated text with respect to quality, specifically to diversity and accuracy, to selectively adjust one or more parameters of a reinforcement learning algorithm to support diversity and quality characteristics of the generated text.

SUMMARY

The embodiments include a computer system, computer program product, and method for reinforcement learning.

In one aspect, a computer system is provided with a processor and memory for use with an artificial intelligence (AI) platform and corresponding AI tools. The processor is operatively coupled to the memory and is in communication with the AI platform. The AI platform tools include a question manager, an answer manager, an evaluation manager, and a director. The question manager functions to leverage a question generator to generate a first synthetic question corresponding to a ground truth passage and ground truth answer. The answer manager functions to present the synthetic question to a trained neural network and to obtain a first answer from the ground truth passage. The first answer is semantically related to the first synthetic question and the ground truth passage. The evaluation manager functions to automatically evaluate the first synthetic question with respect to the first answer, with the evaluation incorporating a reward function that captures diversity and accuracy of the first synthetic question. The director functions to employ reinforcement learning to selectively modify the question generator responsive to the evaluation, wherein the modified question generator produces one or more synthetic questions with an increased textual diversity than before the modification.

In another aspect, a computer program device is provided to support reinforcement learning. The computer program product includes a computer readable storage medium having a program code embodied therewith. The program code is executable by a processor to generate a synthetic question to yield further textually diverse synthetic questions and accurate answers. Program code leverages a question generator to generate a first synthetic question corresponding to a ground truth passage and ground truth answer. The program code submits the synthetic question to a trained neural network and obtains a first answer from the ground truth passage, with the first answer being semantically related to the first synthetic question and the ground truth passage. Program code is provided to automatically evaluate the first synthetic question with respect to the first answer, with the evaluation incorporating a reward function that captures diversity and accuracy of the first synthetic question. The program code employs reinforcement learning to selectively modify the question generator responsive to the evaluation, wherein the modified question generator produces one or more synthetic questions with an increased textual diversity than before the modification.

In yet another aspect, a method is provided for supporting reinforcement learning. A first synthetic question corresponding to a ground truth passage and ground truth answer is generated from a question generator. The synthetic question is presented to a trained neural network from which a first answer from the ground truth passage is obtained. The first answer is semantically related to the first synthetic question and the ground truth passage. The first synthetic question is automatically evaluated with respect to the first answer. The evaluation incorporates a reward function that captures diversity and accuracy of the first synthetic question. Reinforcement learning is utilized to selectively modify the question generator based on the evaluation, wherein the modified question generator produces one or more synthetic questions with an increased textual diversity than before the modification.

These and other features and advantages will become apparent from the following detailed description of the exemplary embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
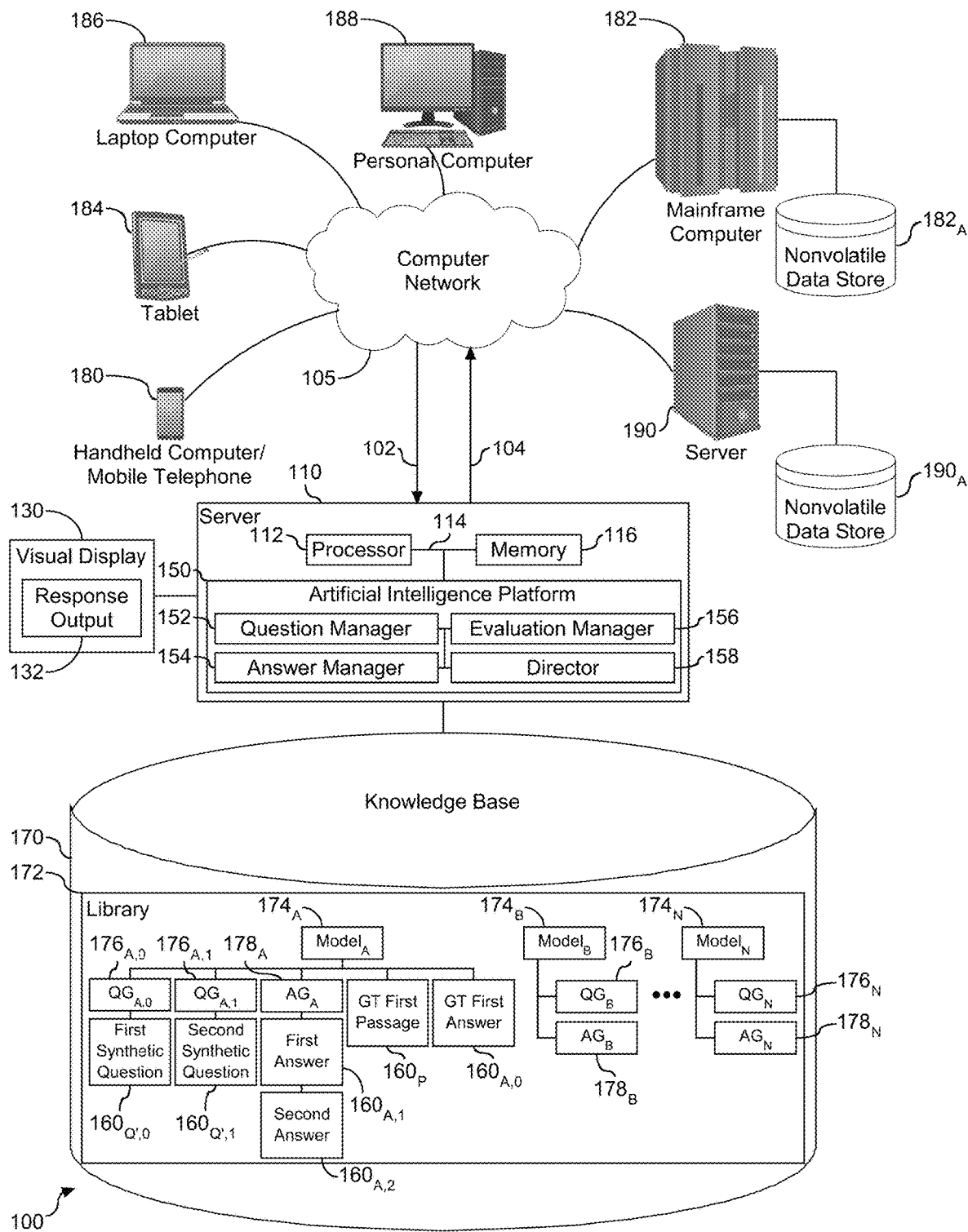
FIG. 1 depicts a system diagram illustrating a computer system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least an embodiment. Thus, appearances of the phrases "a select embodiment," "in one embodiment," or "in an embodiment" in various places throughout this specification are not necessarily referring to the same embodiment. The various embodiments may be combined with one another.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. More specifically, ML is the application of AI through creation of neural networks that can demonstrate learning behavior by performing tasks that are not explicitly programmed. ML requires data that is analyzed, formatted and conditioned to build a machine learning model and to train a machine learning algorithm. It is understood in the art that a ML algorithm is a computerized procedure than when trained on the data, generates a ML model. Selecting the ML algorithm is essential to successfully applying ML. Examples of ML include, but are not limited to, regression algorithms, decision trees, instance-based algorithms, and clustering algorithms. Once the data is prepared and the algorithm is trained, the ML model can make determinations or predictions about the data. The greater the quantity of data provided, the more the model learns and improves accuracy of its predictions.

ML models fall into the following basic categories: supervised machine learning, unsupervised machine learning, reinforcement machine learning, and deep learning. Supervised learning algorithms learn a mapping function for a data set with an existing classification, where unsupervised learning algorithms can categorize an unlabeled data set based on some hidden features in the data. Reinforcement learning can learn policies for decision-making in an uncertain environment through iterative exploration of that environment. Deep learning incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

A language model is a mechanism that takes a sequence of words, such as a phrase or partial phrase, as input, and produces output in the form of a probability distribution of the next word. For each word in a vocabulary, the language model predicts the probability that the next word in the sequence is that specific word. The variable Y is utilized to represent a vocabulary populated with words, where the words $y_0, y_1, y_2, \ldots, y_{n-1}$ are the first n−1 words in a sequence, and $y_n$ is the next unknown word. The language model produces a probability assessment each word, y, in the vocabulary, Y, where the probability is represented as follows:

$$\Pr(Y_n = y | y_0, y_1, y_2, \ldots, y_{n-1})$$

Similar to a language model, a sequence-to-sequence model maps a fixed length input with a fixed length output, wherein the fixed length of the input and output may differ. The sequence-to-sequence model takes a sequence $x_0, \ldots, x_n$ and produces a probability distribution over output sequences $y_0, \ldots y_m$. For example and with respect to machine translation, the sequence $x_0, \ldots, x_n$ represents a sentence in a first language with n words, and $y_0, \ldots y_m$ represents a sentence in a second language, different from the first language, with a possibly different quantity of words. Sequence-to-sequence models may be used for various tasks, including generating the next utterance produced by a chatbot, or an answer to a question given the question and a corresponding passage as input.

Models commonly generate text sequentially, e.g. one word at a time. Typically, the probability distribution over the next word to be generated depends on the input and the words that have already been generated. The 'next' word to be generated affects the sentence that is generated, and in an embodiment changes the sentence to be generated. As shown and described herein, the model is modified to create diversity of the output. The sequence-to-sequence model takes a passage and an answer as input and outputs a corresponding question. In an embodiment, this model with the question output is referred to as a question generator (QG). As shown and described herein, an embodiment is directed at teaching a QG to generate diverse questions and to generate questions with desired semantics. Diversity is directed at mitigating or avoiding repetitively generating the same question, while mitigating or avoiding generating text that is tangential to the corresponding question and answer. Desired semantics is directed at generating questions that a reasonable mechanism would answer as expected.

The system, computer program product, and method shown and described herein are directed at teaching the question generator (QG) to generate synthetic questions that address the characteristics of diversity and semantics. More specifically, the embodiments are directed at teaching the QG to automatically enable generating diverse questions, restrict generating reasonable text, evaluate the diversity of the generated question, and evaluate quality, i.e. accuracy, diversity, fluency, or other related attributes, of the generated questions, through reinforcement learning.

Referring to FIG. 1 Referring to FIG. 1, a schematic diagram of a computing system (100) is depicted. As shown, a server (110) is provided in communication via links (102) and (104) with a plurality of computing devices (180), (182), (184), (186), (188), and (190) across a computer network (105). The server (110) is configured with a processor (112) in communication with memory (116) across a bus (114). The server (110) is shown with an artificial intelligence (AI) platform (150) for reinforcement learning over the computer network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. The server (110) may be used with components, systems, sub-systems, and/or devices other than those that are depicted herein.

The AI platform (150) is shown herein configured with tools to support machine learning, and more specifically reinforcement learning with respect to synthetic data, e.g. machine generated data, as related to corresponding ground truth (GT) data, e.g. validated or labeled data. It is understood in the art that synthetic data is artificially manufactured, and in an embodiment is manufactured as output from a corresponding neural model. The tools include, but are not limited to, a question manager (152), an answer manager (154), an evaluation manager (156), and a director (158). The AI platform (150) leverages, and in an embodiment modifies, a trained neural network. The AI platform (150) may receive input from the computer network (105) and leverage a data source (170), also referred to herein as a corpus or knowledge base, to selectively process data. The processing includes, but is not limited to, generating synthetic data, and leveraging the synthetic data to optimize output from a selected or identified neural model.

As shown the data source (170) is configured with a library (172) with a plurality of neural models, shown herein as $model_A$ ($174_A$), $model_B$ ($174_B$), ..., $model_N$ ($174_N$). Although only three models are shown, this quantity should not be considered limiting. Similarly, in an embodiment, the data source (170) may be considered with one or more additional libraries, each having one or more neural models. Each of the neural models may combine the functionality of a question generator, QG, and an answer generator, AG, into a single neural model. In an embodiment, the neural models may embody the QG and AG as components of the model, such as a first question generator, $QG_{A,0}$ ($176_{A,0}$), a second question generator, $QG_{A,1}$ ($176_{A,1}$), and $AG_A$ ($178_A$) embodied in $model_A$ ($174_A$), $QG_B$ ($176_B$) and $AG_B$ ($178_B$) embodied in $model_B$ ($174_B$), and $QG_N$ ($176_N$) and $AG_N$ ($178_N$) embodied in $model_N$ ($172_N$). Details of how the models are utilized, and in an embodiment modified, are shown and described in detail below.

It is understood that the supervised learning leverages data reflected in one of the models in the data source. As shown herein, the data source is referred to as the knowledge base (170) and is configured with logically grouped models. The question manager (152) functions to identify an appropriate library and model semantically related to corresponding GT data. Once identified, the question manager presents or inputs a GT first passage ($160_P$) and a corresponding ground first answer ($160_{A,0}$) to the identified model, e.g. $model_A$ ($174_A$), which for descriptive purposes includes a QG component, referred to herein as the first QG component, $QG_{A,0}$ ($176_{A,0}$), and an AG component, $AG_A$ ($178_A$). Output from the first QG component, e.g. $QG_{A,0}$ ($176_{A,0}$), is in the form of a synthetic first question, ($160_{Q',0}$) that has a semantic correspondence to both the GT first passage ($160_P$) and the GT first answer ($160_{A,0}$). Accordingly, in response to presentation of submission of the GT data, the question manager (152) receives or obtains a semantically corresponding first synthetic question ($160_{Q',0}$) as output from the first GQ component $QG_{A,0}$ ($176_{A,0}$).

The answer manager (154), shown herein operatively coupled to the question manager (152), manages processing of the synthetic question ($160_{Q',0}$). More specifically, the answer manager (154) presents or inputs the synthetic question ($160_{Q',0}$) to the AG component, e.g. $AG_A$ ($178_A$), corresponding to the identified or subject neural model, e.g. $model_A$ ($174_A$). The AG component, $AG_A$ ($178_A$), generates a first answer ($160_{A,1}$), which is presented to the answer manager (154). The generated first answer ($160_{A,1}$) by the AG, $AG_A$ ($178_A$), is semantically related to both the synthetic question ($160_{Q',0}$) and the GT passage ($160_P$). Accordingly, the QG generates a synthetic question ($160_{Q',0}$) and the AG generates an answer ($160_{A,1}$), with both generated components semantically related to the GT passage ($160_P$) and the GT answer ($160_{A,0}$).

The evaluation manager (156) is shown herein operatively coupled to both the question manager (152) and the answer manager (154). The evaluation manager (156) functions to automatically evaluate the generated synthetic question ($160_{Q',0}$) with respect to the generated first answer ($160_{A,1}$). The goal is to generate a synthetic question that meets the requirements of a corresponding sematic relationship while also being diverse to mitigate repetition of the same question while enhancing output from the AG. The evaluation manager (156) employs a reward function to capture both the diversity and the quality of the synthetic question ($160_{Q',0}$). Accordingly, the evaluation manager (156) assesses diversity and quality and reflects the assessment in a corresponding reward function.

The director (158), shown herein operatively coupled to the evaluation manager (156), functions to selectively modify the first question generator $QG_{A,0}$ ($176_{A,0}$) based on the evaluation of the first synthetic question ($160_{Q',0}$). The modification is selective with the goal of increasing textual diversity of a generated synthetic question. As shown, a second question generator, $QG_{A,1}$ ($176_{A,1}$) is created by the question manager (152) and operatively coupled to the model, $Model_A$ ($174_A$). The second question generator, $QG_{A,1}$ ($176_{A,1}$), is a modification of the first question generator $QG_{A,0}$ ($176_{A,0}$) and functions to generate a second synthetic question ($160_{Q',1}$) that is diverse from the first synthetic question ($160_{Q',0}$) while being accurate with respect to the corresponding GT passage ($160_P$) and GT answer ($160_{A,0}$). For example, in an embodiment the evaluation may indicate and proceed with the question manager (152) leveraging the modified $QG_{A,1}$ ($176_{A,1}$) to generate a second synthetic question, ($160_{Q',1}$), with the answer manager (154) to generate a second answer ($160_{A,2}$) based on the corresponding second synthetic question, ($160_{Q',1}$). In an embodiment the optimization involves modifying the first question generator $QG_{A,0}$ ($176_{A,0}$) using a policy gradient algorithm on its parameters based on the reward function. When generating the first and second synthetic questions, ($160_{Q',0}$) and ($160_{Q',1}$), the director (158) employs sampling with text generation to promote diversity of the synthetic questions. The sampling may be nucleus sampling, or in another embodiment a top-k sampling. The optimization of the question generator includes the director (158) to represent the first synthetic question ($160_{Q',0}$) with a diversity score and to modify one or more parameters of the first question generator, $QG_{A,0}$ ($176_{A,0}$) based on the diversity score, thereby effectively creating a second question generator, $QG_{A,1}$ ($176_{A,1}$). The optimization employed by the director (158) mitigates production of a second or subsequent synthetic question, ($160_{Q',1}$), as output from the model, $model_A$ ($174_A$), with context similar to the first or prior synthetic question ($160_{Q',0}$). It is understood that in an embodiment, the evaluation may indicate that the first synthetic question ($160_{Q',0}$) and corresponding answer ($160_{A,0}$) have met the threshold or parameters of the reward function. Accordingly, the director (158) interfaces with the evaluation manager (156) to selectively generate one or more additional synthetic questions.

As briefly above, the synthetic question is evaluated with respect to diversity. In addition, the evaluation manager (156) assesses or evaluates the synthetic question for accuracy to ensure that GT first passage ($160_P$) can support the synthetic question. The synthetic questions are given to the answer generator, $AG_A$ ($178_A$), and the generated answer associated with each synthetic question is compared with the GT Answer ($160_{A,0}$). Evaluation entails the evaluation manager (156) conducting a comparison of the output from the AG, $AG_A$ ($178_A$) in the form of the first answer ($160_{A,0}$) in response to the first synthetic question ($160_{Q',0}$) and the second answer ($160_{A,1}$) in response to the second synthetic question ($160_{Q',1}$), with the GT answer ($160_{A,0}$). The evaluation manager (156) further quantifies an accuracy of the evaluation with an accuracy score. Based on the value assigned to the accuracy score, the question manager (152) will selectively modify one or more parameters that encompass generation of the synthetic question(s). The accuracy score and the diversity score described herein may be combined by the evaluation manager (156) to compute a reward, and to communicate with the question manager (152) based on the computed reward to selectively modify one or more parameters that encompass generation of the synthetic question(s) in order to mitigate or eliminate production of a synthetic question by the question manager (152) that is semantically similar to one or more previously generated synthetic questions. In an embodiment, the reward is a convex combination of the accuracy and diversity scores. Similarly, in an embodiment, the evaluation manager (156) may selectively prioritize one or more components of the reward function by selectively adjusting corresponding components or parameters of the convex combination. Response output (132) in the form of answer data identified in the passage by promoting diversity in the generated synthetic question(s) may be presented on an operatively coupled visual display (130) or communicated to one or more of the computing devices (180), (182), (184), (186), (188), and (190).

As shown, the computer network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (160) is configured with libraries and one or more neural models populated or logically grouped therein for use by the AI platform (150). The various computing devices (180), (182), (184), (186), (188), and (190) in communication with the computer network (105) may include access points for the logically grouped models. Some of the computing devices may include devices for a database storing the corpus of data as the body of information used by the AI platform (150) to generate response output (132) and to communicate the response output (132) to a corresponding network device, such as a visual display (130), operatively coupled to the server (110) or one or more of the computing devices (180), (182), (184), (186), (188), and (190) across the computer network (105).

In some illustrative embodiments, the server (110) may be the IBM Watson® system available from International Business Machines Corporation of Armonk, N.Y., which is augmented with the mechanisms of the illustrative embodiments described hereafter. The managers (152), (154), and (156), and the director (158), hereinafter referred to collectively as AI tools, are shown as being embodied in or integrated within the AI platform (150) of the server (110). The AI tools may be implemented in a separate computing system (e.g., 190), or in an embodiment they can be implemented in one or more systems connected across the computer network (105) to the server (110). Wherever embodied, the AI tools function to dynamically optimize generating diverse and accurate synthetic questions to optimize the generated answers.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen or tablet computer (184), laptop or notebook computer (186), personal computer system (188), and server (190). As shown, the various devices and systems can be networked together using the computer network (105). Types of the computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$)). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
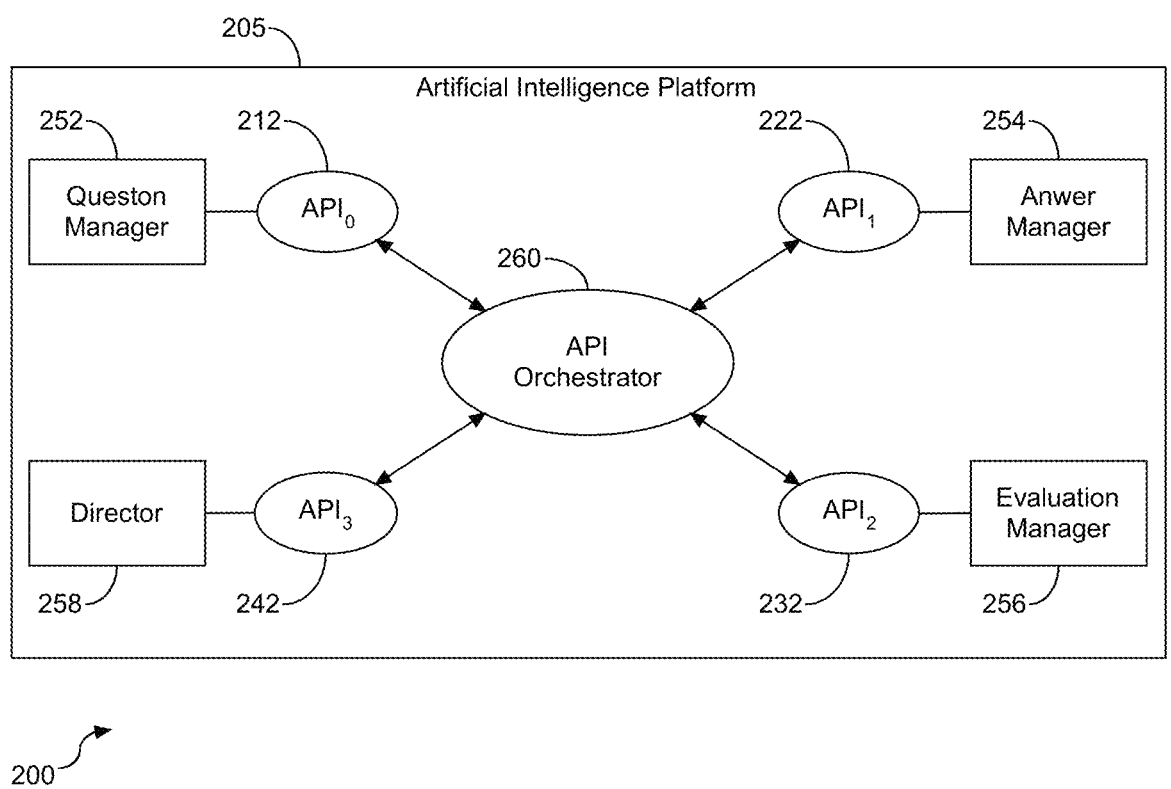
FIG. 2 depicts a block diagram illustrating the tools from the computing system and their associated Application Program Interface.

An Application Program Interface (API) is understood in the art as a software intermediary between two or more applications. With respect to the AI platform (150) shown and described in FIG. 1, one or more APIs may be utilized to support one or more of the tools (152), (154), (156), and (158) and their associated functionality. Referring to FIG. 2, a block diagram (200) is provided illustrating at least some of the tools (252), (254), (256), and (258) and their associated APIs. As shown, a plurality of tools is embedded within the AI platform (205), with the tools including the question manager (152) shown herein as (252) associated with $API_0$ (212), the answer manager (154) shown herein as (254) associated with $API_1$ (222), the evaluation manager (156) shown herein as (256) associated with $API_2$ (232), and the director (158) shown herein as (258) associated with $API_3$ (242). Each of the APIs may be implemented in one or more languages and interface specifications. $API_0$ (212) provides functional support to generate one or more synthetic questions, with each generated synthetic question being semantically corresponding to the GT passage and GT first answer. $API_1$ (222) provides functional support for the generation of an answer that is semantically related to a corresponding synthetic question and the GT passage. $API_2$ (232) provides functional support to evaluate the generated answer in relation to the GT answer, which includes incorporating a reward function in the evaluation, with the reward function capturing both diversity and accuracy of the first synthetic question, where accuracy is measured using the first generated answer. $API_3$ (242) provides functional support to selectively modify the question generator in response to the answer evaluation, with the modification directed at increasing textual diversity and maintaining accuracy of the synthetic question(s). As shown, each of the APIs (212), (222), (232), and (242) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
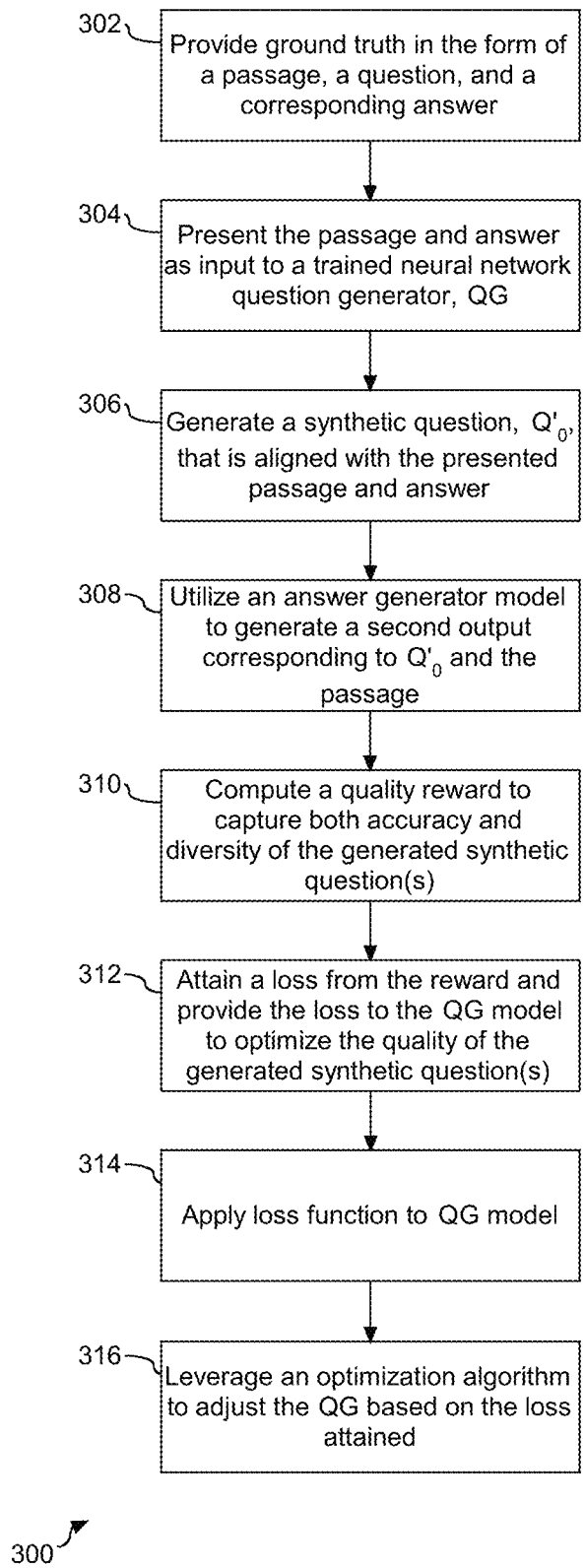
FIG. 3 depicts a flow chart illustrating application of reinforcement learning to support and enable generating questions that are diverse and accurate.

Referring to FIG. 3, a flow chart (300) is provided to illustrate a process for applying reinforcement learning to a question generator to support and enable generating synthetic questions that are diverse and accurate. GT is a term used in machine learning that refers to a training set for machine learning techniques that contains a trusted reference truth. For example, the GT training set would contain questions and answers generated by humans known to be true. For example, the label of a dataset classified as GT is deemed to be accurate. As shown and described herein and directed at training a QG model, GT is provided in the form of a passage, P, a question, Q, and a corresponding answer, A (302). As shown, a passage, P, and an answer, A, are presented as input to a trained neural network question generator (QG), (304). In an embodiment, a second neural network is provided to generate answers from the questions. Similarly, in an embodiment, a single neural network is built for both questions generator and answering systems. The QG creates output corresponding to the received input, namely, generating a synthetic question, $Q_0'$, that is aligned with the presented passage, P, and answer, A, (306). The process of generating the synthetic question, $Q_0'$, sequentially generates the words, $q_j$, that form the synthetic question, $Q_0'$, and subjects the words, $q_j$, to a diversity assessment. In an embodiment, and as shown herein, the words, $q_j$, are subject to sampling where at each word generation step, the possible next words are sorted. In the case of nucleus sampling, a probability mass is established, e.g. probability limit, and the words $q_j$ are limited with respect to the probability mass. In an embodiment, the probability mass is a configurable parameter. The words that form and comprise the synthetic question are generated and assessed until the synthetic question terminating word of character is reached, after which the synthetic question is generated from the QG model with the words selected from the sampling. Accordingly, the synthetic question, $Q_0'$, generated from the QG model is created to align with the GT passage, P, and the GT answer, A.

The synthetic question generated at step (306) is subject to further assessment and refinement with respect to diversity and accuracy. As shown, an answer generator (AG) model is utilized to generate a second output, referred to herein as an answer, $A_0'$, corresponding to the synthetic question, $Q_0'$, and the passage, P, (308). An accuracy reward of the answer is computed. In an embodiment, the accuracy reward, race is the following:

$$|A \cap A_0'|/|A \cup A_0'|$$

The accuracy reward assesses similarity between the answer, $A_0'$, generated by the AG model and corresponding to the synthetic question and the GT answer, A. In addition, a diversity reward, $r_{div}$, is also computed for the generated synthetic question(s) (310). In an embodiment, the diversity reward, $r_{div}$, assesses a diversity metric to quantify the novelty of the generated synthetic question(s) with respect to the GT question, Q, and all questions that the QG previously generated $\{Q'_1, \ldots, Q'_{i-1}\}$ for the GT passage, P, and answer, A. The accuracy reward and the diversity reward are combined to compute a quality score, e.g. reward, for the QG model. The following is a representation of the quality reward, R, computation:

$$R = w_1 \cdot r_{acc}(A, A_0') + w_2 \cdot r_{div}(Q_i', Q, \{Q'_1, \ldots, Q'_{i-1}\})$$

where $w_1$ and $w_2$ are tunable weights for the accuracy and diversity rewards, respectively. Accordingly, as shown, the reward, R, is a weighted average of accuracy and diversity.

A loss is attained from the reward, R, and provided to the QG model to optimize the quality of one or more future generated synthetic questions (312). The loss is utilized to update the parameters of the QG model (314), and an optimization algorithm is leveraged to adjust the QG (316) based on the loss attained at step (312). The optimization at steps (314) and (316) uses reinforcement learning during training. The process shown in FIG. 3 may be repeated over all instances of training examples present in the training set, and the process may be iterated multiple times over all such instances. Reinforcement learning is utilized to attain and apply a loss to learn how to generate synthetic questions as output from the QG model with the synthetic questions representing diverse content or context with respect to other synthetic questions generated and accurate content or context with respect to the GT passage, P, and answer, A.

The tools and corresponding functionality thereof utilize reinforcement learning and a corresponding reinforcement learning algorithm to optimize the question generator based on the synthetic question(s) and corresponding generated answer(s). Output from the reinforcement learning algorithm learns values of different states, such as diversity and accuracy, and assesses a corresponding reward that encompasses these states. The reinforcement learning supports selective adjustment of components of the reward, e.g. prioritization of one or more of the components, to enhance diversity and/or accuracy of the synthetic question and corresponding answer from the GT passage. Accordingly, the reinforcement learning shown and described herein dynamically learns values of different states, which may then be applied to create a corresponding neural model.

Embodiments shown and described herein may be in the form of a computer system for use with an intelligent computer platform for providing and support reinforcement learning directed at generating diverse synthetic questions. Aspects of the tools (152), (154), (156), and (158) and their associated functionality may be embodied in a computer system/server in a single location, or in an embodiment, may be configured in a cloud based system sharing computing resources. With references to FIG. 4, a block diagram (400) is provided illustrating an example of a computer system/server (402), hereinafter referred to as a host (402) in communication with a cloud based support system (410), to implement the system, tools, and processes described above with respect to FIGS. 1-3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
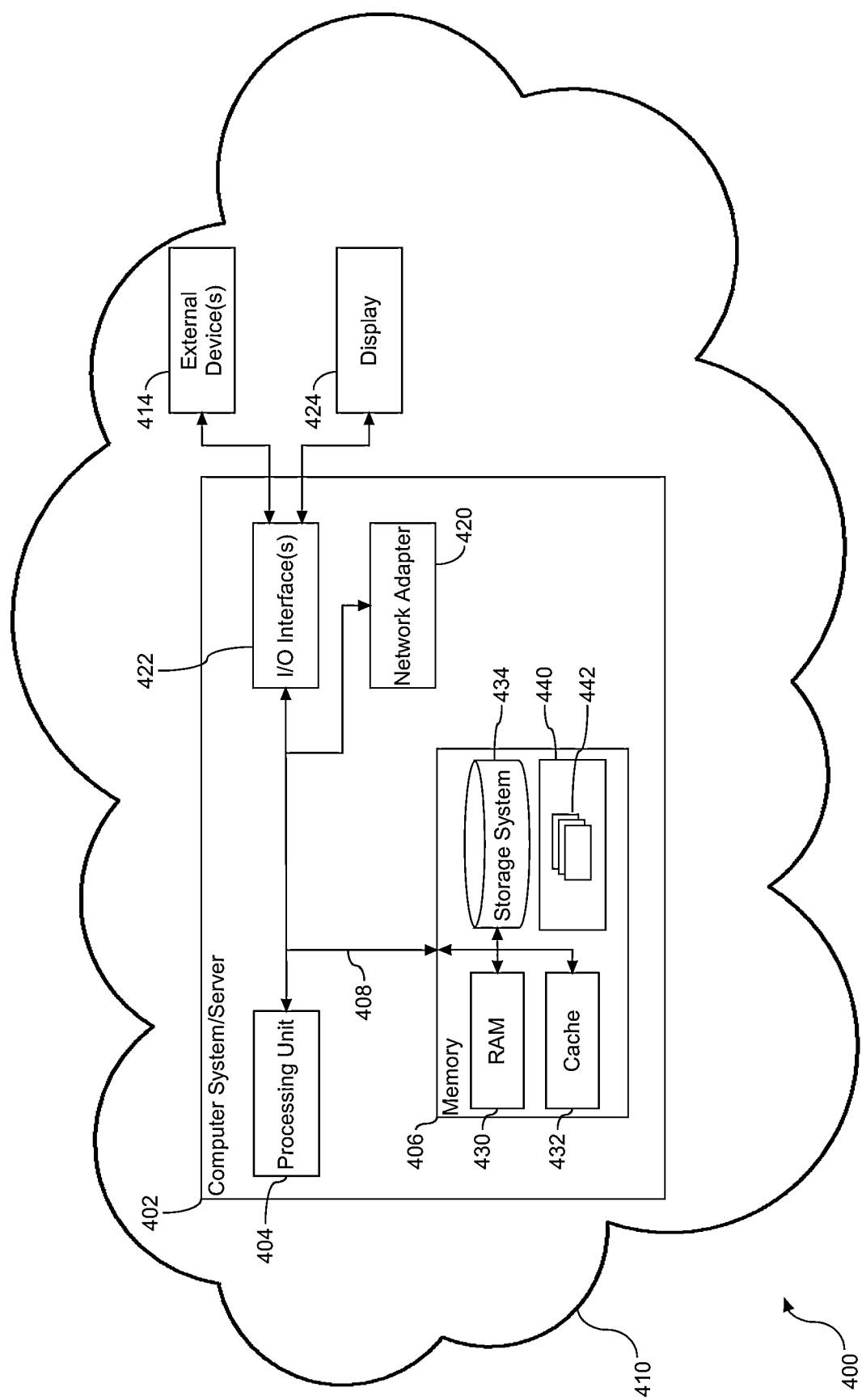
FIG. 4 depicts a block diagram illustrating an example of a computer system/server of a cloud based support system, to implement the system and processes described above with respect to FIGS. 1-3.

As shown in FIG. 4, host (402) is shown in the form of a general-purpose computing device such as a computer system and/or server. The components of host (402) may include, but are not limited to, one or more processors or processing units (404), e.g. hardware processors, a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to dynamically orchestrate of activities across one or more domains to minimize risk. For example, the set of program modules (442) may include the tools (152), (154), (156), and (158) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In an embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
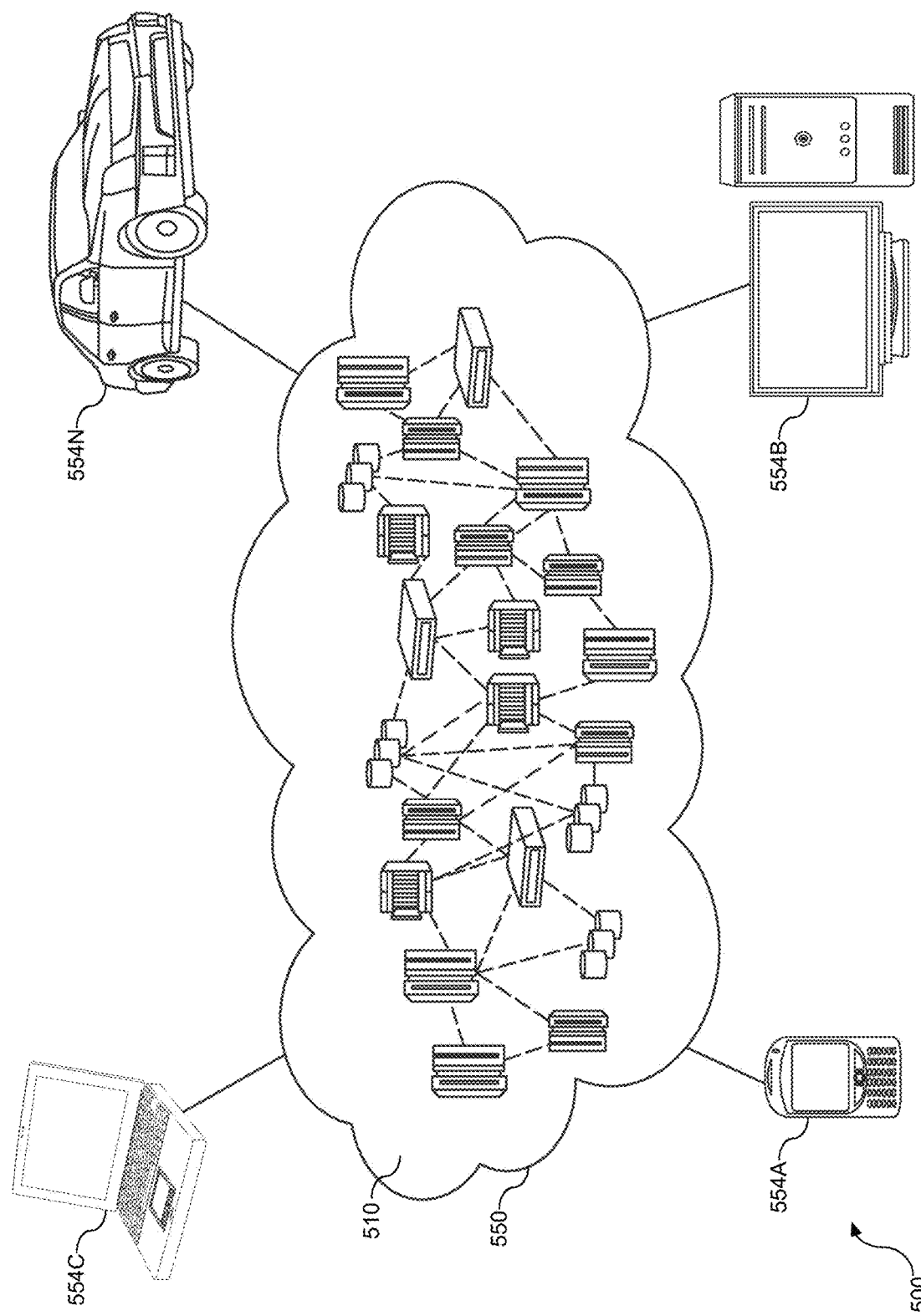
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
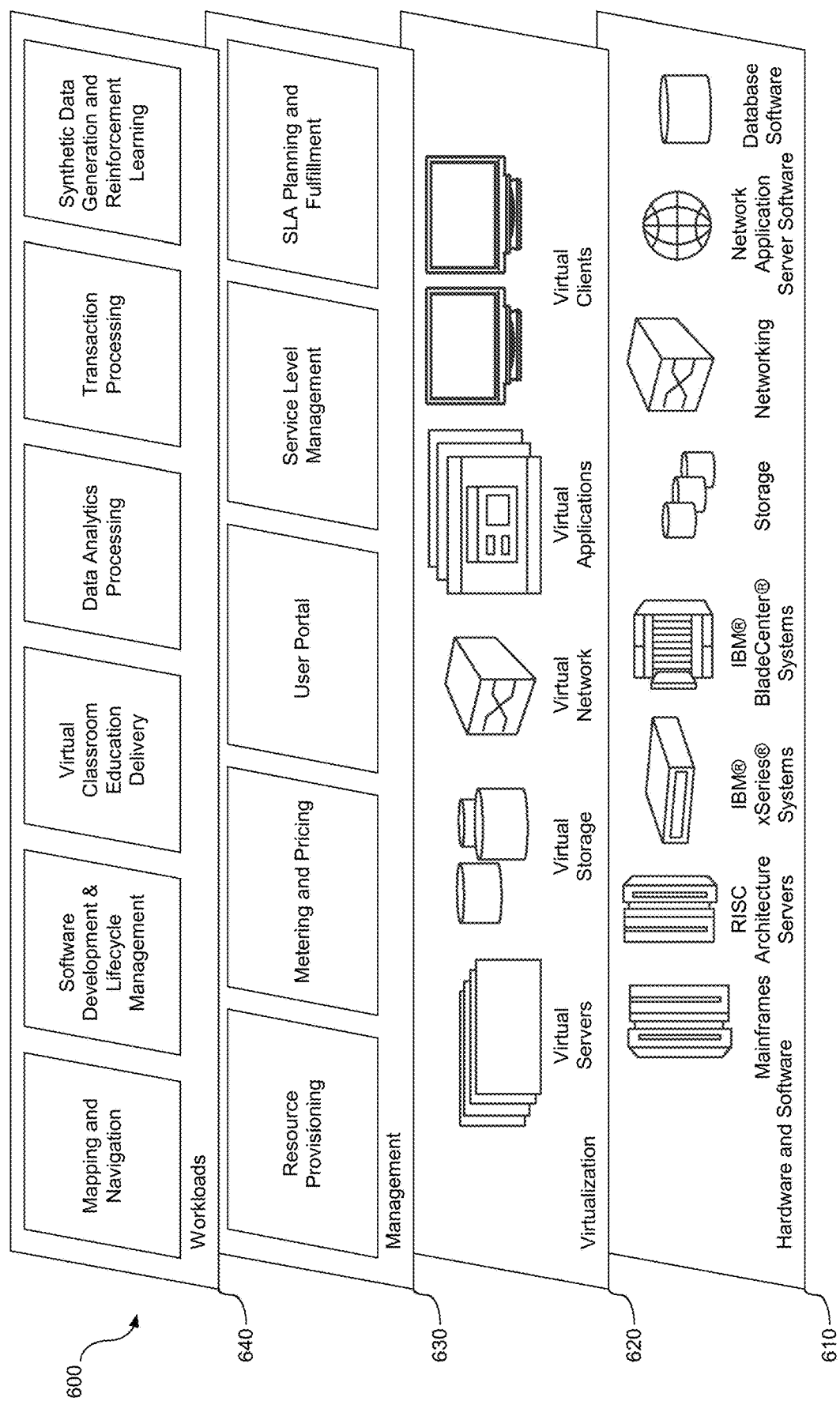
FIG. 6 depicts a block diagram illustrating a set of functional abstraction model layers provided by the cloud computing environment.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and synthetic data generation and reinforcement learning.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to build a federated learning framework.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processor operatively coupled to a memory; and
an artificial intelligence (AI) platform, in communication with the processor, to support reinforcement learning, the AI platform having tools, comprising:
a question manager configured to input a ground truth first passage and a ground truth first answer to a trained neural network, and obtain a first synthetic question generated by a question generator in the trained neural network, the generated first synthetic question having a semantic correspondence to the ground truth first passage and the ground truth first answer;
an answer manager configured to input the first synthetic question to the trained neural network, and to obtain a first answer generated by the trained neural network, the generated first answer semantically related to the generated first synthetic question and the ground truth first passage;
an evaluation manager configured to automatically evaluate the generated first synthetic question with respect to the generated first answer, the evaluation to incorporate a reward function that captures diversity and accuracy of the generated first synthetic question; and
a director, operatively coupled to the evaluation manager, configured to:
employ reinforcement learning to selectively modify the question generator responsive to the evaluation, wherein the modified question generator is configured to produce one or more second synthetic questions with an increased textual diversity than before the modification; and
represent the generated first synthetic question with a first score and selectively modify one or more parameters of the trained neural network based on the first score, wherein the first score is a diversity score reflecting a novelty of the first synthetic question relative to a ground truth question, and wherein the modification of the one or more parameters mitigates production of the one or more second synthetic questions as output from the trained neural network with context similar to the first question.

2. The system of claim 1, wherein the selective modification of the question generator comprises the director configured to employ nucleus sampling to generate the one or more second synthetic questions.

3. The system of claim 2, wherein the director is further configured to optimize variation of the generated first synthetic question.

4. The system of claim 3, wherein the evaluation manager is configured to evaluate accuracy of the generated first synthetic question by comparison of the generated first answer with the ground truth first answer and to quantify the accuracy evaluation with a second score, and the question manager is configured to selectively modify the one or more parameters responsive to the second score.

5. The system of claim 4, wherein the evaluation manager is configured to compute the reward function as a convex combination of the second score and the first score, wherein the question manager is configured to selectively modify the one or more parameters responsive to the computed reward function, and wherein the modification is configured to mitigate production of a second synthetic question semantically similar to the generated first synthetic question.

6. The system of claim 5, wherein the evaluation manager is configured to adjust the convex combination to selectively prioritize one or more components of the reward function.

7. A computer program product to support reinforcement learning, the computer program product comprising:
a computer readable storage medium having a program code embodied therewith, the program code executable by a processor to:
input a ground truth first passage and a ground truth first answer to a trained neural network, and obtain a first synthetic question generated by a question generator in the trained neural network, the generated first synthetic question having a semantic correspondence to the ground truth first passage and the ground truth first answer;

input the first synthetic question to the trained neural network, and to obtain a first answer generated by the trained neural network, the generated first answer semantically related to the generated first synthetic question and the ground truth first passage;

automatically evaluate the generated first synthetic question with respect to the generated first answer, the evaluation to incorporate a reward function that captures diversity and accuracy of the generated first synthetic question;

employ reinforcement learning to selectively modify the question generator responsive to the evaluation, wherein the modified question generator produces one or more second synthetic questions with an increased textual diversity than before the modification; and represent the generated first synthetic question with a first score and selectively modify one or more parameters of the trained neural network based on the first score, wherein the first score is a diversity score reflecting a novelty of the first synthetic question relative to a ground truth question, and wherein the modification of the one or more parameters mitigates production of the one or more second synthetic questions as output from the trained neural network with context similar to the first question.

8. The computer program product of claim 7, wherein the selective modification of the question generator includes program code executable by the processor to employ nucleus sampling to generate the one or more second synthetic questions.

9. The computer program product of claim 8, further comprising program code executable by the processor to optimize variation of the generated first synthetic question.

10. The computer program product of claim 9, further comprising program code executable by the processor to evaluate accuracy of the generated first synthetic question by comparison of the generated first answer with the ground truth first answer and to quantify the accuracy evaluation with a second score, and program code executable by the processor to selectively modify the one or more parameters responsive to the second score.

11. The computer program product of claim 10, further comprising program code executable by the processor to compute the reward function as a convex combination of the second score and the first score, and selectively modify the one or more parameters responsive to the computed reward function, the modification to mitigate production of a second synthetic question semantically similar to the generated first synthetic question.

12. The computer program product of claim 11, further comprising program code executable by the processor to adjust the convex combination to selectively prioritize one or more components of the reward function.

13. A computer implemented method, comprising:
inputting a ground truth first passage and a ground truth first answer to a trained neural network, and obtaining a first synthetic question generated by a question generator in the trained neural network, the generated first synthetic question having a semantic correspondence to the ground truth first passage and the ground truth first answer;

inputting the first question to the trained neural network, and obtaining a first answer generated by the trained neural network, the generated first answer semantically related to the generated first synthetic question and the ground truth first passage;

automatically evaluating the generated first synthetic question with respect to the generated first answer, the evaluation incorporating a reward function capturing diversity and accuracy of the generated first synthetic question;

employing reinforcement learning and selectively modifying the question generator responsive to the evaluation, wherein the modified question generator produces one or more second synthetic questions with an increased textual diversity than before the modification; and representing the generated first synthetic question with a first score and selectively modifying one or more parameters of the trained neural network based on the first score, wherein the first score is a diversity score reflecting a novelty of the first synthetic question relative to a ground truth question, and wherein the modifying the one or more parameters mitigates production of the one or more second synthetic questions as output from the trained neural network with context similar to the first question.

14. The computer implemented method of claim 13, wherein the selective modification of the question generator includes employing nucleus sampling to generate the one or more second synthetic questions.

15. The computer implemented method of claim 14, further comprising optimizing variation of the generated first synthetic question.

16. The computer implemented method of claim 15, further comprising evaluating accuracy of the generated first synthetic question by comparing the generated first answer with the ground truth first answer, quantifying the accuracy evaluation with a second score, and selectively modifying the one or more parameters responsive to the second score.

17. The computer implemented method of claim 16, further comprising computing the reward function as a convex combination of the second score and the first score, and selectively modifying the one or more parameters responsive to the computed reward function, the modification to mitigate production of a second synthetic question semantically similar to the generated first synthetic question.

* * * * *